(12) United States Patent
Aldridge et al.

(10) Patent No.: US 8,827,000 B2
(45) Date of Patent: Sep. 9, 2014

(54) AERATOR WITH LOW FUEL LEVEL CONTROL

(75) Inventors: Bradley P. Aldridge, Raleigh, NC (US); Chris Michael Georgoulias, Raleigh, NC (US); Marquez Giovonnie Perkins, Apex, NC (US)

(73) Assignee: Deere & Company, Moline, IL (US)

( * ) Notice: Subject to any disclaimer, the term of this patent is extended or adjusted under 35 U.S.C. 154(b) by 348 days.

(21) Appl. No.: 13/435,404

(22) Filed: Mar. 30, 2012

(65) Prior Publication Data
US 2013/0255975 A1    Oct. 3, 2013

(51) Int. Cl.
*A01B 41/06* (2006.01)

(52) U.S. Cl.
USPC .................................. 172/2; 172/21

(58) Field of Classification Search
CPC ........ A01B 45/00; A01B 45/02; A01B 63/00; A01B 63/10; A01B 63/1006
USPC ............................. 172/1, 2, 21, 22
See application file for complete search history.

(56) References Cited

U.S. PATENT DOCUMENTS

| | | |
|---|---|---|
| 4,602,687 A | 7/1986 | Hansen |
| 4,606,411 A | 8/1986 | Classen |
| 4,645,012 A | 2/1987 | Hansen et al. |
| 4,662,456 A | 5/1987 | Classen |
| 4,750,565 A | 6/1988 | Hansen et al. |
| 4,753,298 A | 6/1988 | Hansen et al. |
| 4,776,404 A | 10/1988 | Rogers et al. |
| 4,867,244 A | 9/1989 | Cozine et al. |
| 5,207,278 A | 5/1993 | Hatlen |
| 5,570,746 A | 11/1996 | Jones et al. |
| 5,709,272 A | 1/1998 | Jones et al. |
| 6,041,869 A | 3/2000 | Lewis et al. |
| 6,102,129 A | 8/2000 | Classen |
| 6,209,508 B1 * | 4/2001 | Tinney ................. 123/196 S |
| 6,543,394 B2 * | 4/2003 | Tinney ..................... 123/1 A |
| 6,561,282 B2 | 5/2003 | Smith |
| 6,588,449 B1 * | 7/2003 | Kippe ..................... 137/399 |
| 6,948,568 B2 | 9/2005 | Banks |
| 7,096,969 B2 | 8/2006 | Petersen et al. |
| 7,267,181 B2 | 9/2007 | Banks |
| 7,293,612 B1 | 11/2007 | Petersen et al. |
| 7,472,759 B2 | 1/2009 | Petersen et al. |
| 7,669,667 B2 | 3/2010 | Petersen et al. |
| 7,730,960 B1 | 6/2010 | Knight et al. |
| 2001/0015180 A1 * | 8/2001 | Tinney ..................... 123/1 A |
| 2005/0023009 A1 | 2/2005 | Banks |
| 2006/0027253 A1 * | 2/2006 | Kaiser ..................... 134/94.1 |
| 2011/0005783 A1 | 1/2011 | Livingstone |
| 2011/0160991 A1 | 6/2011 | Crombez et al. |
| 2011/0213530 A1 | 9/2011 | Hunt et al. |
| 2011/0226362 A1 * | 9/2011 | Oxley et al. .................. 137/572 |
| 2011/0288729 A1 | 11/2011 | McKinney |

FOREIGN PATENT DOCUMENTS

| | | |
|---|---|---|
| EP | 0861578 | 9/1998 |
| EP | 0861578 | 10/2001 |
| EP | 2260686 A1 | 12/2010 |
| WO | 2004016070 | 8/2004 |

OTHER PUBLICATIONS

European Search Report dated Jun. 28, 2013 (6 pages).

* cited by examiner

*Primary Examiner* — Jamie L McGowan

(57) ABSTRACT

An aerator with low fuel level control includes a low fuel level sensor, and a controller electrically connected to the low fuel level sensor and to the coring head that provides a warning to the operator and raises the coring head and/or prevents lowering the coring head into the operating position after the low fuel level sensor indicates a low fuel level in the fuel tank.

13 Claims, 5 Drawing Sheets

AERATOR WITH LOW FUEL LEVEL CONTROL

FIELD OF THE INVENTION

This invention relates to aerators for aerating ground surfaces. More specifically, the invention relates to walk-behind aerators having coring heads with a plurality of tines that repeatedly penetrate the ground surface.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have a coring head with tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

During aeration of golf course greens or other long periods of operation, the operator may not monitor the fuel level gauge located on the fuel tank. If the aerator runs out of fuel, the coring head can become stuck in the down position with the tines in the ground.

Some aerators may include an electro/hydraulic lift pump which may be used to raise the coring head without the engine running. Thus, if the aerator is out of fuel but has sufficient battery power, the operator may actuate the electro/hydraulic pump on the aerator to pull the tines up from the ground without damaging the turf. However, the electro/hydraulic lift pump may increase the cost and complexity of the aerator.

Alternatively, the operator may pull the tines from the ground by removing and disconnecting the tine holders from the arms on the coring head. The operator then may open a bypass valve on the aerator drive train so he can push the aerator off the green surface. This can be a laborious and slow process, and can risk damage to the turf.

An aerator with low fuel level control is needed to reduce the cost and complexity of the machine. An aerator with low fuel level control is needed that is not laborious or slow to operate in a low fuel level condition, and that minimizes the risk of turf damage.

SUMMARY OF THE INVENTION

An aerator with low fuel level control includes a low fuel level sensor in the fuel tank of the aerator, and a controller connected to a raise and lower mechanism. In response to signals from the low fuel level sensor, the controller causes the mechanism to raise the coring head and/or restricts the mechanism from lowering the coring head. The controller also may actuate a warning signal when a low fuel signal is received from the low fuel level sensor. The aerator with low fuel level control reduces cost and complexity of the machine, is easy to operate in a low fuel level condition, and minimizes the risk of turf damage

DESCRIPTION OF THE PREFERRED EMBODIMENT

Figure 1:
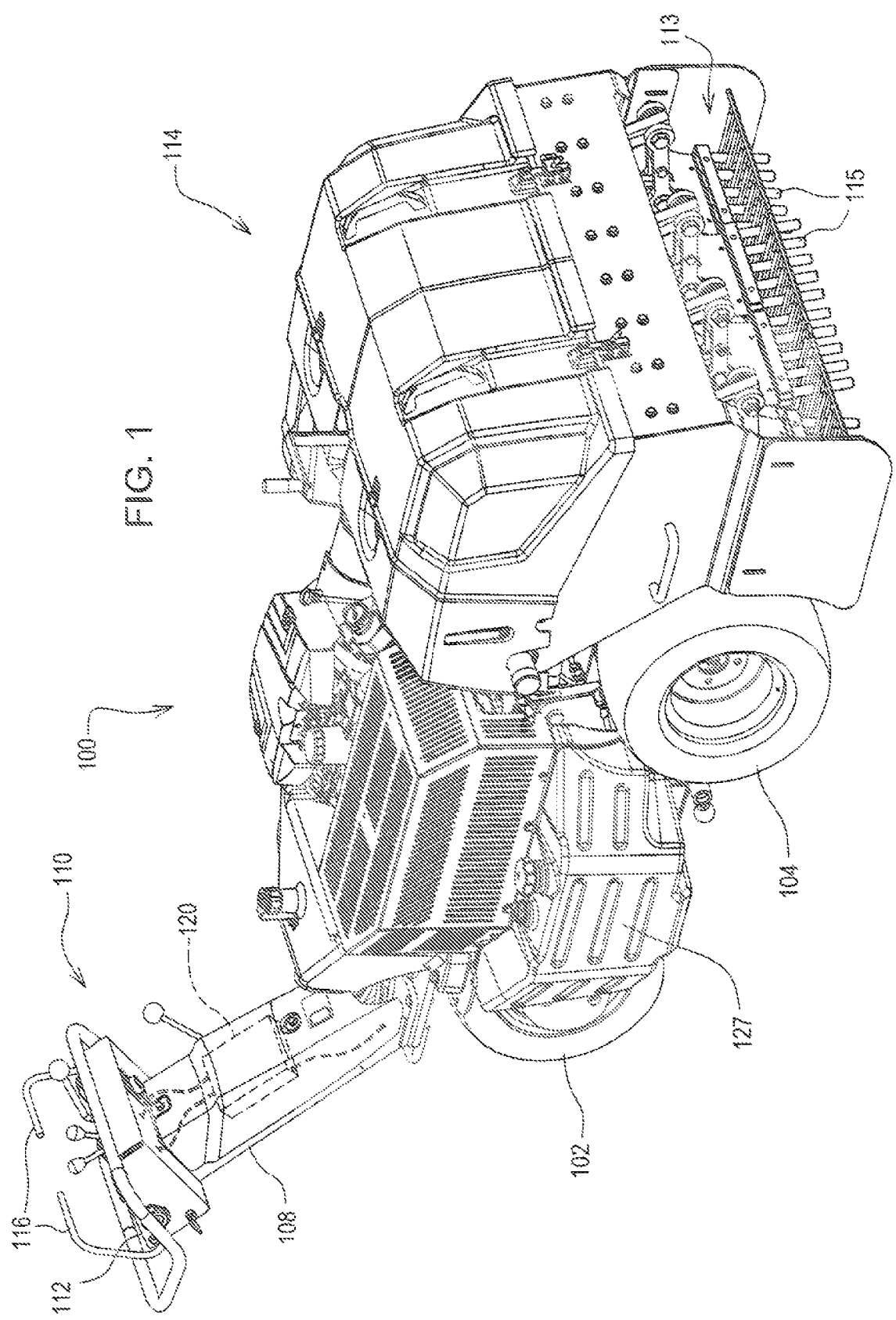
FIG. 1 is a perspective view of an aerator with low fuel level control, with the coring head in the lowered or operating position, according to a preferred embodiment of the invention.

In one embodiment shown in FIG. 1, walk-behind aerator 100 may be supported for movement over the ground by a single steerable wheel 102, which may or may not be driven, and a pair of driven wheels 104. The frame of the aerator may have a neck 108 extending upwardly therefrom, and the single steerable wheel may be carried in a pivotal yoke that can rotate about a vertical pivot axis attached to the neck. An upwardly and forwardly extending handle assembly 110 may be coupled to the pivotal yoke that carries the front wheel, and may include control panel 112. An operator may walk ahead of the aerator and steer the vehicle by using the handle assembly to pivot the single steerable front wheel about the vertical pivot axis.

In one embodiment, coring head 114 may be mounted on the rear of the aerator, either behind the rear drive wheels and tires, between the rear drive wheels and tires, or adjacent the rear axle(s). The coring head may carry a plurality of tine assemblies 113 that reciprocate up and down by rotation of a crankshaft. Each tine assembly may have a plurality of coring tines 115 that are driven into the ground and produce holes for the purpose of aerating the turf. Each tine assembly may include a rubber dampener system that absorbs the forward motion of the aerator to help improve hole quality by minimizing hole elongation. In FIG. 1, the coring head is shown in the lowered or operating position.

In one embodiment, the aerator may have an internal combustion engine supported on the frame that may be used to operate coring head 114. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels. Alternatively, the internal combustion engine may drive an alternator or generator to generate electric power for electric traction drive motors. For example, each electric traction drive motor may independently rotate each wheel.

In one embodiment, the operator may operate the traction drive to move the aerator forward or in reverse by moving traction bail 116 in either the forward or reverse direction. The traction bail may be a single lever or a pair of levers pivotably mounted to the sides of the operator controls on the handle assembly of the aerator. The traction bail may be biased to a central or neutral position when released by the operator.

The aerator described in this application may be provided with a hydrostatic traction drive that can move the machine in the forward direction at a coring ground speed while the coring head is operating, or in the reverse direction while the coring head is not operating. Additionally, the hydrostatic traction drive can move the aerator in the forward direction at a higher transport speed while the coring head is not operating. An operator typically may walk in front of the aerator as it moves in the forward direction. However, those skilled in the art will understand that the aerator with low fuel level control of this invention is not limited to aerators with the same forward and reverse designations used in this application, but is intended to include any other walk behind aerators.

Figure 2:
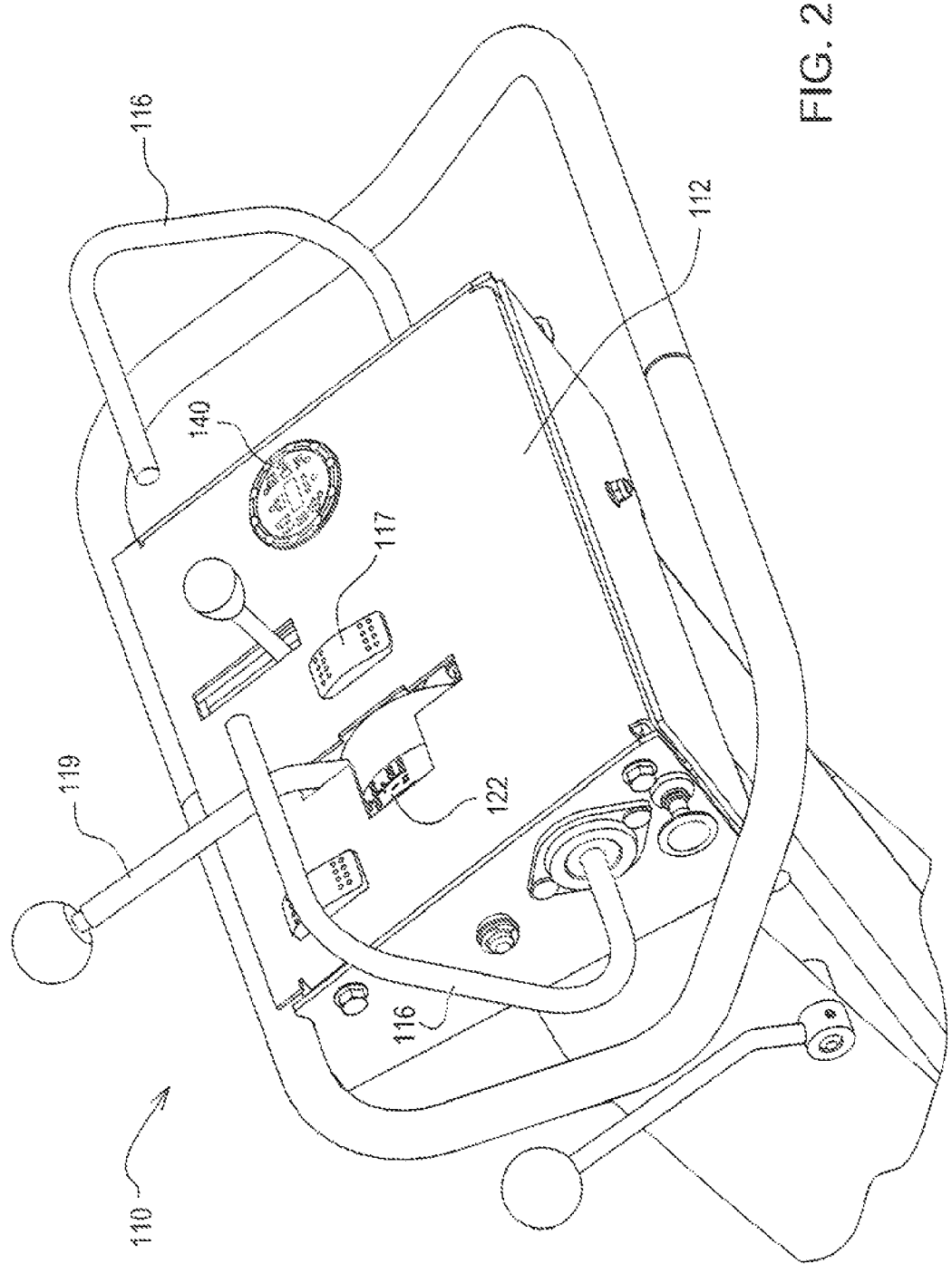
FIG. 2 is a perspective view of operator controls for an aerator with low fuel level control according to a preferred embodiment of the invention.
Figure 5:
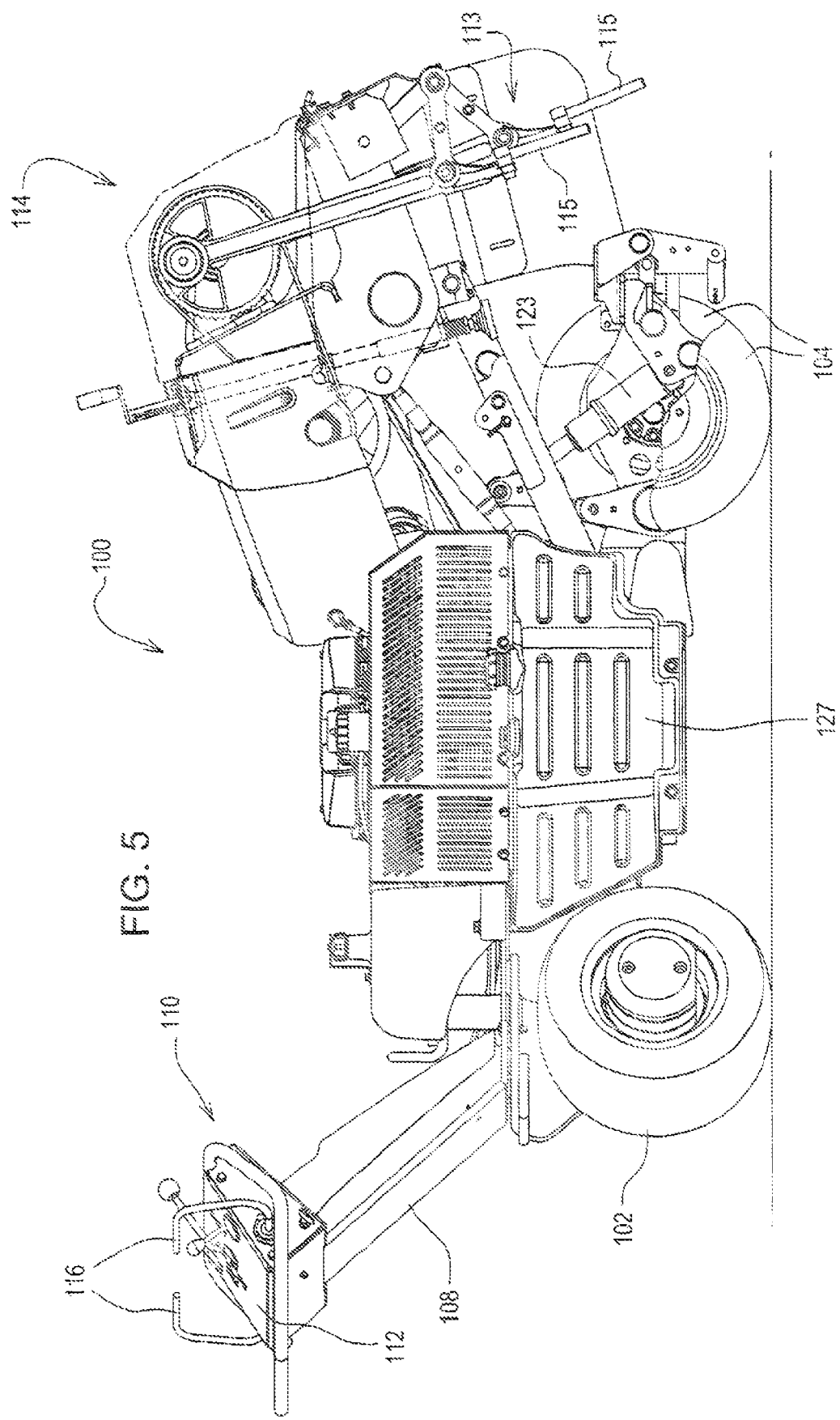
FIG. 5 is a side view of an aerator with low fuel level control, with the coring head in the raised or transport position, according to a preferred embodiment of the invention.

In one embodiment, the aerator may include a hydraulic lift and lower system to raise the coring head to a transport position and lower the coring head to an operating or coring position. For example, the coring head lift and lower system may include a hydraulic circuit that may extend or retract lift cylinder 123 shown in FIG. 5. As shown in FIG. 2, the aerator may include switch 117 on control panel 112 that an operator may actuate to raise and lower the coring head. Switch 117 may be electrically connected to controller 120. A controller, as that term is used herein, may include any electrical logic circuit or switches that can perform the steps and functions described below in the following paragraphs. In response to actuation of the switch, the controller may provide a signal to a solenoid valve in the hydraulic circuit to extend or retract cylinder 123. Alternatively, the coring head lift and lower system may include an electrical or electro-mechanical device to raise and lower the coring head. The aerator with low fuel level control may be used with an electrical or electro-mechanical device to raise and lower the coring head. However, the aerator with low fuel level control eliminates any need for an electrical or electro-mechanical device in addition to a hydraulic mechanism that raises and lowers the coring head.

In one embodiment, the operator may increase or decrease the forward or coring ground speed while the aerator is moving and the coring head is operating. Increasing or decreasing the coring ground speed of the aerator changes the hole spacing. The operator may change the coring ground speed by moving speed control lever 119 to any position between a minimum speed setting and a maximum speed setting. The speed control lever may be pivotably mounted on the operator controls 112 of aerator handle assembly 110.

In one embodiment, operator controls 112 may include speed display or dial 122 showing the forward ground speed or hole spacing of the aerator while the coring head is operating. The speed display or dial may indicate where the speed control lever is positioned along a plurality of discrete or continuously variable speed settings corresponding to hole spacing settings. For example, the speed display or dial may indicate if the speed control lever is at one of multiple hole spacing settings between a minimum of about one inch and a maximum of about three inches.

Figure 3:
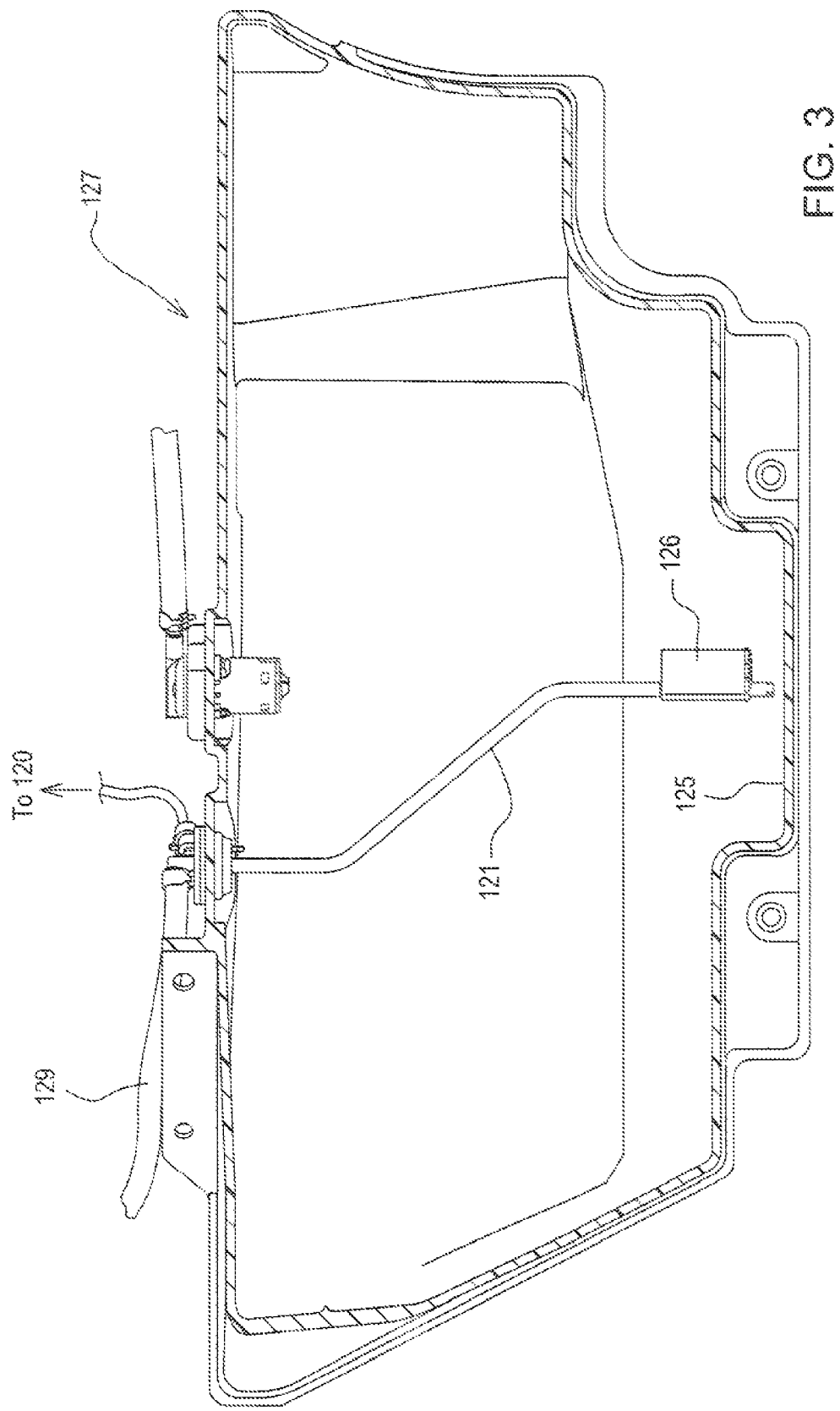
FIG. 3 is a cross section view of a fuel tank for an aerator with low fuel level control according to a preferred embodiment of the invention.

In one embodiment, as shown in FIG. 3, the aerator may include low fuel level sensor 126 positioned in the lowest or bottom portion of fuel tank 127. The low fuel level sensor may include a float connected to a potentiometer or switch, that closes the switch if the fuel is depleted below a specified low fuel level in the tank. For example, the low fuel level sensor may be attached to the lower end of fuel pickup tube 121 at or near a lower portion 125 of the fuel tank. The fuel pickup tube may be connected by fuel line 129 to the aerator's internal combustion engine. The low fuel level sensor may be connected by electrical lines to vehicle controller 120. The low fuel level sensor may send an electrical signal to controller 120 indicating if it senses a low fuel level or normal fuel level in fuel tank 127. In addition to the low fuel level sensor, fuel tank 127 also may be equipped with a fuel gauge to monitor the tank's fuel level, a roll-over valve and filler cap.

In one embodiment, one or more warning indicators may be provided on control panel 112 that the controller may actuate when the controller receives a low fuel level signal from the sensor. For example, the warning indicators may include a visible low fuel level light 140 and/or an audible alarm. The controller may actuate one or more of the warning indicators if the low fuel level sensor provides a signal to the controller indicating a low fuel condition.

Figure 4:
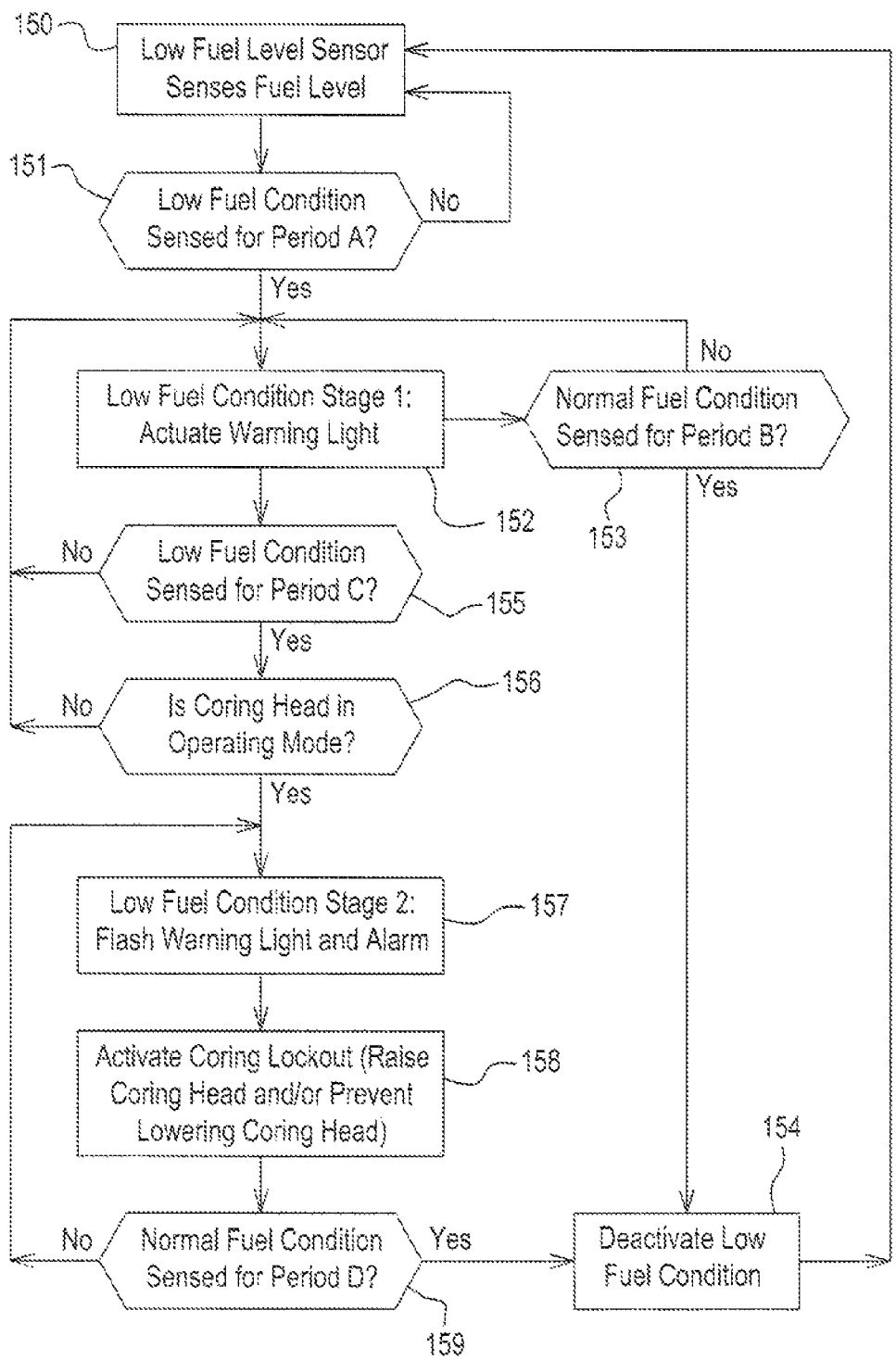
FIG. 4 is a logic diagram for an aerator with low fuel level control according to a preferred embodiment of the invention.

In one embodiment, the aerator with low fuel level control may include low fuel level sensor 126 and controller 120 which may be programmed to perform the steps described in the logic diagram of FIG. 4. In block 150, low fuel level sensor 126 may sense the fuel level in fuel tank 127 in real time. In block 151, controller 120 may determine if the signal from the low fuel level sensor indicates a low fuel condition for de-bounce period A. This de-bounce period should be sufficient so that oscillation of the switch or sloshing of fuel is not sufficient to get a low fuel condition. The duration of the period typically may be longer than one second, and may depend at least in part on the travel distance of the aerator at an average speed before a contour change on the grass surface. If the low fuel level sensor signal indicates a low fuel condition for less than period A, the low fuel level sensor may continue sensing the fuel level in block 150. If the low fuel sensor signal indicates a low fuel condition for period A, in block 152 the controller may actuate warning light 140 or LED on the operator station indicating a stage 1 low fuel condition.

In one embodiment, after the aerator is in a stage 1 low fuel condition, an operator may add fuel to the tank. Thus, in block 153, the controller may determine if the signal from the low fuel level sensor indicates a normal fuel condition for de-bounce period B. This de-bounce period also should be sufficient so that oscillation of the switch or sloshing of fuel is not sufficient to get a low fuel condition. The duration of the period also may be longer than one second, and also may depend at least in part on the travel distance of the aerator at an average speed before a contour change on the grass surface. If the low fuel level sensor signal indicates a normal fuel condition for period B, in block 154 the controller may deactivate the low fuel condition function and return to block 150. Otherwise, if the low fuel level sensor signal does not indicate a normal fuel condition for period B, the controller may continue actuating the warning light for a stage 1 low fuel condition.

In one embodiment, an operator may continue the coring operation for a specified period of time after the aerator is in the stage 1 low fuel condition. As a result, in block 155, the controller may determine if the signal from the low fuel level sensor indicates a low fuel condition for de-bounce period C. For example, period C may be longer than period A. The duration of period C may be based on the average fuel depletion rate during coring operation of the aerator, and the fuel level at the start of the stage 1 low fuel condition. As a result, period C may conclude before the tank is emptied. If the low fuel level sensor signal indicates a low fuel condition for period C, in block 156 the controller may check if the machine is in a mode where the coring head is in the lowered or operating mode. If the aerator is not in a mode where the coring head is lowered, the controller may continue to actuate the warning light in block 152. If the machine is in a mode where the coring head is lowered, in block 157 the controller may actuate one or more warning signals indicating a stage 2 low fuel condition. For example, the stage 2 warning signals may be a flashing warning light and an audible alarm. Additionally, in block 158 the controller may activate the coring lockout function which raises the coring head from the lowered or operating position to the raised or transport position. The controller may raise the coring head by providing an electrical signal to a solenoid valve in a hydraulic circuit which extends lift cylinder 123, or may raise the coring head using another electrical or electro-mechanical mechanism. Additionally, while the coring lockout function is active, the controller may prevent lowering the coring head. Thus, switch 117 may not be used to lower the coring head while the coring lockout function is active. In block 159, the controller may determine if the signal from the low fuel level sensor indicates a normal fuel condition for de-bounce period D. If the low fuel level sensor indicates a normal fuel condition for period D, in block 154 the controller may deactivate the low fuel condition function, and the aerator may return to normal operation in block 150, where the low fuel level sensor senses the fuel level. Otherwise, if a normal fuel condition is not sensed for period D, the controller may continue to actuate one or more warning signals indicating a stage 2 low fuel condition, and also may continue the lockout that prevents lowering the coring head. In one embodiment, the aerator with low fuel level control may allow use of the traction drive to transport the aerator while the aerator is in a stage 2 low fuel condition while the coring head remains in the raised position and the low fuel level condition persists.

Having described the preferred embodiment, it will become apparent that various modifications can be made without departing from the scope of the invention as defined in the accompanying claims.

The invention claimed is:

1. An aerator with low fuel level control, comprising:
    a coring head mounted to the aerator and moveable between a raised transport position and a lowered operating position;
    a fuel tank mounted to the aerator and having a low fuel level sensor;
    a controller electrically connected to the low fuel level sensor and to the coring head that prevents lowering the coring head into the lowered operating position after the low fuel level sensor indicates a low fuel level in the fuel tank.

2. The aerator with low fuel level control of claim 1 further comprising an operator control panel having a warning light that the controller actuates when the low fuel level sensor indicates a low fuel level in the fuel tank.

3. The aerator with low fuel level control of claim 1 further comprising a timer that the controller actuates when the low fuel level sensor indicates a low fuel level in the fuel tank.

4. The aerator with low fuel level control of claim 3 wherein the controller actuates a warning light and the timer after the low fuel level sensor indicates a low fuel level in the fuel tank, and raises the coring head after the timer reaches a specified time setting.

5. The aerator with low fuel level control of claim 1 wherein the low fuel level sensor is attached to a fuel pick-up tube.

6. An aerator with low fuel level control, comprising:
    a controller mounted to the aerator and connected to a raise and lower mechanism that raises a coring head on the aerator to a transport position and lowers the coring head to an operating position;
    a low fuel level sensor in a fuel tank on the aerator that provides a low fuel level signal to the controller;
    the controller causing the raise and lower mechanism to raise the coring head and restricting the raise and lower mechanism from lowering the coring head in response to the low fuel level signal.

7. The aerator with low fuel level control of claim 6 wherein the controller actuates a warning signal when a low fuel level signal is received from the low fuel level sensor.

8. The aerator with low fuel level control of claim 6 wherein the controller signals the raise and lower mechanism to raise the coring head a specified time period after a low fuel level signal is received from the low fuel level sensor.

9. The aerator with low fuel level control of claim 7 wherein the controller allows the raise and lower mechanism to lower the coring head after a normal fuel level signal is received from the low fuel level sensor.

10. The aerator with low fuel level control of claim 7 wherein the controller provides a first warning signal when a low fuel level signal is received from the low fuel level sensor, and a second warning signal following a specified time period after the low fuel level signal is received.

11. An aerator with low fuel level control, comprising:
    a fuel tank on the aerator with a low fuel level sensor that provides a low fuel level signal if the fuel level in the tank is low, and a normal fuel level signal if the fuel level in the tank is normal; and
    a coring head lift and lower mechanism that raises the coring head to a transport position a specified time period after the low fuel level sensor provides a low fuel level signal, and does not lower the coring head to an operating position if the low fuel level sensor provides a low fuel level signal.

12. The aerator with low fuel level control of claim 11 further comprising a warning indicator on the aerator that is generated in response to the low fuel level signal.

13. The aerator with low fuel level control of claim 12, wherein the lift and lower mechanism can lower the coring head to an operating position if the low fuel level sensor provides a normal fuel level signal.

* * * * *